M. E. MOREL.
VALVE STRUCTURE.
APPLICATION FILED OCT. 16, 1912.

1,058,996.

Patented Apr. 15, 1913.
2 SHEETS—SHEET 1.

Witnesses

Inventor
M. E. Morel
By
Attorney

M. E. MOREL.
VALVE STRUCTURE.
APPLICATION FILED OCT. 16, 1912.
1,058,996.
Patented Apr. 15, 1913.
2 SHEETS—SHEET 2.
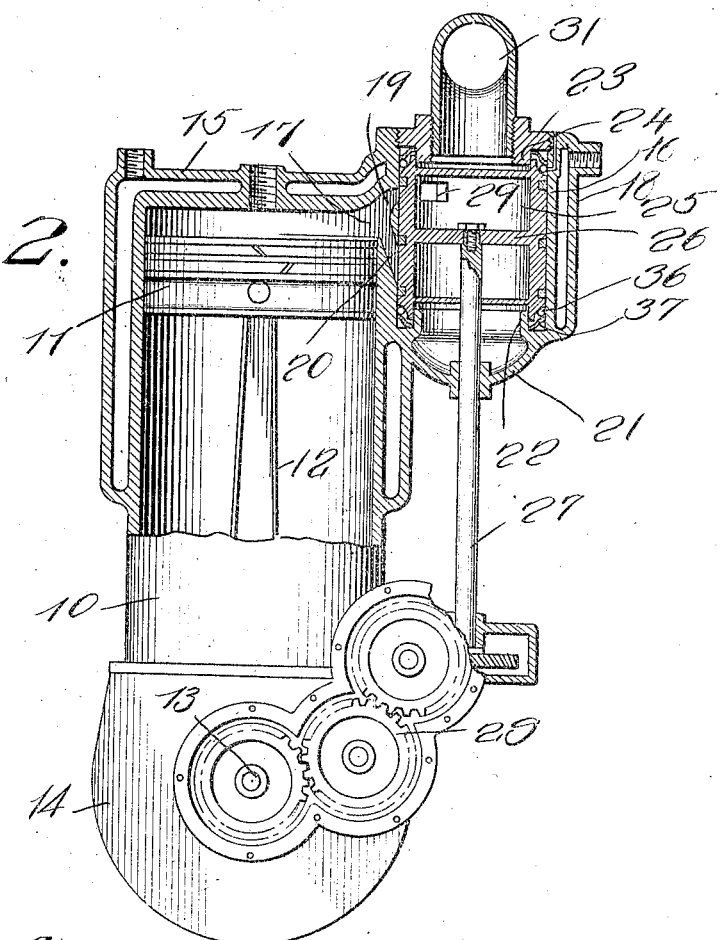
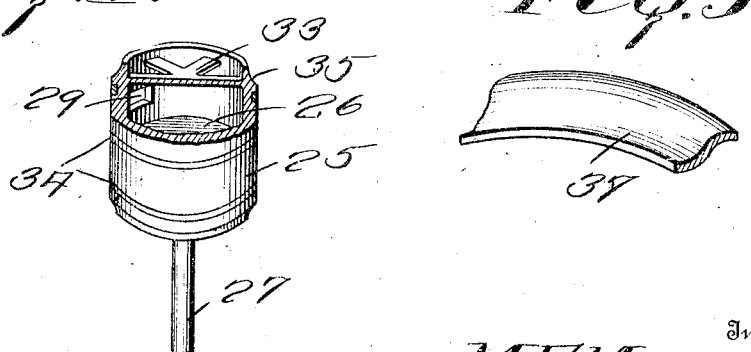

UNITED STATES PATENT OFFICE.

MARSHALL E. MOREL, OF SHERIDAN, ILLINOIS.

VALVE STRUCTURE.

1,058,996.   Specification of Letters Patent.   Patented Apr. 15, 1913.

Application filed October 16, 1912. Serial No. 726,137.

*To all whom it may concern:*

Be it known that I, MARSHALL E. MOREL, a citizen of the United States, residing at Sheridan, in the county of Lasalle, State of Illinois, have invented certain new and useful Improvements in Valve Structures; and I do hereby declare the following to be a full, clear, and exact description of the invention, such as will enable others skilled in the art to which it appertains to make and use the same.

This invention relates to valve structures for gas engines and has for an object to generally improve the particular valve structure described in my co-pending application for Letters Patent, filed March 14, 1912, under Ser. No. 683,737.

An object of the present invention is to provide the valve with internal webs to prevent warping of the valve out of shape, and furthermore to provide the valve with piston rings which prevent leakage past the valve and facilitate rotation of the valve, there being novel ball bearings assembled with the valve to promote the easy and free rotation of the valve.

With the above objects in view the invention consists of certain novel details of construction and combination of parts hereinafter fully described and claimed, it being understood that various modifications may be made in the minor details of construction within the scope of the appended claim.

Figure 1:
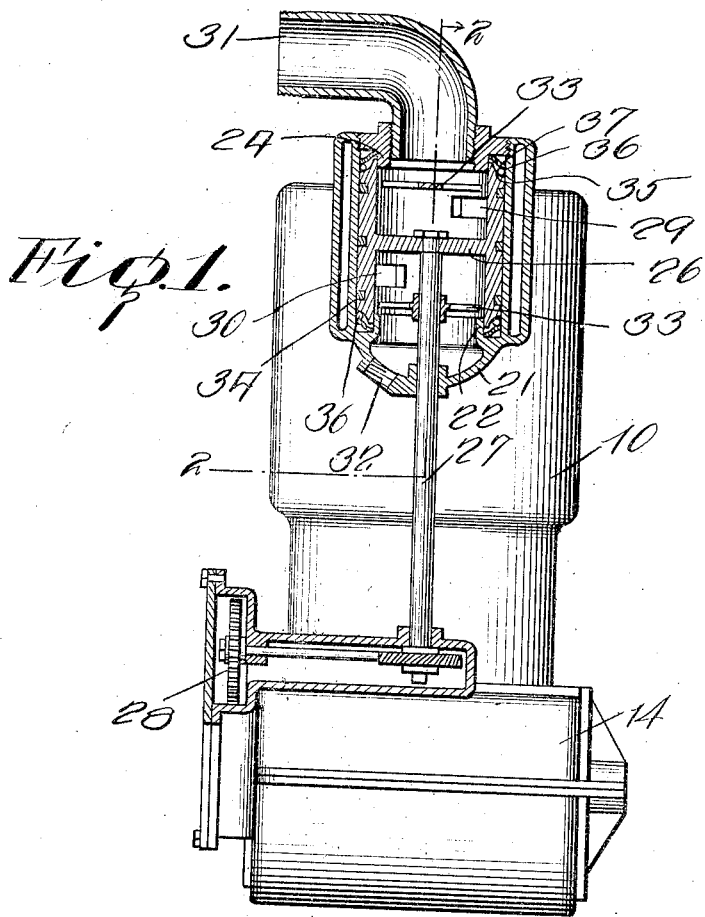
Figure 3:
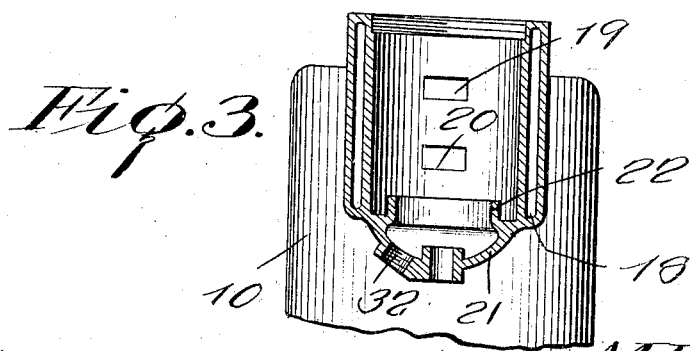

In the accompanying drawings forming part of this specification:—Figure 1 is a side elevation of a single cylinder engine with my improved valve applied thereto, the valve being shown in section. Fig. 2 is a longitudinal section on the line 2—2 Fig. 1. Fig. 3 is a sectional view through the valve chamber with the valve removed. Fig. 4 is a perspective view of the valve. Fig. 5 is a detail perspective view of a portion of one of the steel bearing rings.

Referring now to the drawings in which like characters of reference designate similar parts, 10 designates a gas engine cylinder within which works a piston 11 having a piston rod 12 which is operatively connected to a crank shaft 13 that is journaled in the crank case 14.

The cylinder head 15 is provided on one side with a cylindrical valve chamber 16 which is water-jacketed as shown at 18 and communicates with the clearance space 17 of the cylinder through spaced inlet and exhaust ports 19 and 20 respectively. The bottom of the valve casing is closed by a bottom 21 provided with an upwardly directed flange 22, and the top of the valve casing is closed by a plug 23 having a downwardly directed flange 24.

The valve comprises a hollow cylindrical body 25 fitting closely within the valve casing and having its upper and lower ends respectively engaged against the plug and the bottom of the valve casing with the plug flange 24 and bottom flange 22 retaining the valve in position as shown in Fig. 1. The valve body is provided with a central cross partition 26 to which a stand shaft 27 is fixed for rotating the valve, the lower end of this shaft being connected by a train of gearing 28 to the crank shaft. This train of gearing is so proportioned that the valve will be turned through one complete revolution for every two revolutions of the crank shaft. As in my co-pending application the valve is provided above the partition wall with a port 29 adapted to register with the intake port of the cylinder during the intake stroke of the piston, and below the partition with a port 30 adapted to register with the outlet port of the cylinder during the exhaust stroke. An intake pipe 31 is connected to the plug, and an outlet pipe 32 is connected to the bottom of the valve casing.

The parts above described are constructed in accordance with my former invention, the present invention being in the nature of improvements on the valve body 25.

Arranged above and below the partition wall 26 are webs 33 which strengthen the cylindrical wall of the body against warping, these webs being of skeleton structure as shown to facilitate passage of the fresh and burnt gases therethrough. A plurality of piston rings 34 are mounted in circumferential grooves formed in the cylindrical body and prevent leakage of the gases past the body. Formed in the upper and lower external edges of the body are cone surfaces 35 within which are confined balls 36, these balls riding upon bearing rings of the general shape shown at 37, which rings are interposed between the valve chamber and the valve body as clearly shown in Fig. 1. During rotation of the valve these balls promote the free and easy turning of the valve.

What is claimed, is:—

The combination with a gas engine of a valve chamber having an upstanding flange on the bottom, a plug closing said chamber and having a downwardly extending flange, a rotary cylindrical valve in said chamber bearing upon said bottom and said plug and maintained in position by said flanges, a plurality of piston rings on said valve, a plurality of webs arranged transversely in said valve and bracing said valve against distortion, cone surfaces formed on the outer lower and upper edges of said valve, bearing rings confined in the spaces between said cone surfaces and said plug and valve bottom respectively, and balls confined between and bearing upon said rings and cone surfaces.

In testimony whereof, I affix my signature, in the presence of two witnesses.

MARSHALL E. MOREL.

Witnesses:
 ROBT. KNAPP,
 DAN DOLDER.